(12) United States Patent
Volanthen et al.

(10) Patent No.: US 8,325,056 B2
(45) Date of Patent: Dec. 4, 2012

(54) SYSTEM FOR UNDERWATER COMMUNICATIONS COMPRISING FLUID MODIFYING MEANS

(75) Inventors: Mark Volanthen, Hampshire (GB); Brendan Hyland, Edinburgh (GB)

(73) Assignee: WFS Technologies Ltd., Edinburgh (GB)

( * ) Notice: Subject to any disclaimer, the term of this patent is extended or adjusted under 35 U.S.C. 154(b) by 467 days.

(21) Appl. No.: 12/707,068

(22) Filed: Feb. 17, 2010

(65) Prior Publication Data

US 2011/0199227 A1    Aug. 18, 2011

(51) Int. Cl.
H04B 13/02    (2006.01)

(52) U.S. Cl. .......... 340/850; 324/334; 324/239

(58) Field of Classification Search ........... 367/154, 367/6, 131, 142, 901, 904, 134; 324/334, 324/239; 340/850; 343/719
See application file for complete search history.

(56) References Cited

U.S. PATENT DOCUMENTS

| | | | | |
|---|---|---|---|---|
| 5,010,530 A * | 4/1991 | Riley | ............. | 367/154 |
| 5,452,262 A * | 9/1995 | Hagerty | ............. | 367/6 |
| 5,525,907 A * | 6/1996 | Frazier | ............. | 324/334 |
| 5,729,134 A * | 3/1998 | Lavan et al. | ............. | 324/239 |
| 6,130,859 A | 10/2000 | Sonnenschein et al. | ....... | 367/134 |
| 6,628,118 B1 * | 9/2003 | Amini | ............. | 324/334 |
| 6,999,857 B1 * | 2/2006 | Kasper et al. | ............. | 701/1 |
| 7,006,651 B2 * | 2/2006 | Ueki | ............. | 381/396 |
| 7,505,367 B2 * | 3/2009 | Abdi | ............. | 367/134 |
| 7,711,322 B2 * | 5/2010 | Rhodes et al. | ............. | 455/40 |
| 2008/0198695 A1 * | 8/2008 | Abdi | ............. | 367/134 |
| 2010/0171615 A1 * | 7/2010 | Rhodes et al. | ............. | 340/551 |

FOREIGN PATENT DOCUMENTS

| | | |
|---|---|---|
| GB | 2163029 A | 2/1986 |
| WO | 01/95529 | 12/2001 |
| WO | 2006/134331 | 12/2006 |
| WO | 2009/138800 | 11/2009 |

OTHER PUBLICATIONS

C.E. Shannon, "Communication in the presence of noise", Proc. of the IEEE, vol. 86, No. 2, Feb. 1998.

* cited by examiner

*Primary Examiner* — Jean B Jeanglaude
(74) *Attorney, Agent, or Firm* — Paul Davis; Goodwin Procter LLP

(57) ABSTRACT

A system for underwater communications through a region between a transmit antenna and a receive antenna using electromagnetic signals. When the system is in an inactive mode, the region is occupied by water. When the system is in an active mode, fluid having a reduced conductivity is introduced into the region to provide transmission of electromagnetic signals with a lower attenuation and thereby facilitate a higher data transfer rate for a given range of communication between the transmit antenna and the receive antenna.

25 Claims, 8 Drawing Sheets

SYSTEM FOR UNDERWATER COMMUNICATIONS COMPRISING FLUID MODIFYING MEANS

BACKGROUND OF THE INVENTION

1. Field of Use

The present invention relates to the field of wireless communications by means of electromagnetic signals in an underwater environment.

2. Description of the Related Art

The field of underwater wireless communications is of key importance in a range of industries: oil and gas exploration; environmental monitoring; security and defense. The majority of underwater wireless systems are based on the propagation of mechanical waves, in the form of sonar, or acoustic signaling.

U.S. Pat. No. 6,130,859, "Method and Apparatus for Carrying out High Data Rate and Voice Underwater Communication", Sonnenschein et al. describes a system for underwater communications based on the transmission and reception of acoustic waves. Sonnenschein describes a system where electrical signals are converted to mechanical signals for underwater transmission and vice versa using hydrophones. Communications systems based on the propagation of acoustic or mechanical waves, such as those taught in Sonnenschein suffer from a range of drawbacks. These drawbacks include distortion due to multi-path effects, echoes, Doppler effects, the long time delay between source and receiver, and the lack of a means to discriminate between signals which are produced by several sources.

Advances have been made in the area of wireless telecommunications using electromagnetic signals over the last few decades; however, the recent technological advances apply almost exclusively to wireless communications in air. Wireless communications using electromagnetic signals would be a preferred means for underwater communications. Electromagnetic signals can be produced by a transmitter using well established radio circuitry and design. Electromagnetic signals can be divided into multiple channels, and data modulated onto each channel separately. A vast range of protocols are available for the processing of data sent by electromagnetic signals. Radio transmitters are efficient and do not produce the unwanted drawbacks of acoustic wireless systems.

Unfortunately, electromagnetic signals and radio waves are severely affected by the high conductivity of water (especially sea water) which produces a very high level of attenuation with distance for an underwater radio signal. This effect limits the use of electromagnetic signals for underwater communications to short-range low-bandwidth communications.

GB Patent Application No 8420017, "Inductive Communications System" Raynor, describes a method for underwater communications within a short range by exciting the magnetic component of an electromagnetic signal. However, to overcome the effects of attenuation under water, the inductive communications system taught by Raynor is implemented using low frequency carrier signals. The use of low frequency carrier signals for in wireless communications presents limitations for channel capacity as taught by C. E. Shannon in *"Communication in the presence of noise" Proc. Institute of Radio Engineers* vol. 37 (1): 10-21 (January 1949). Thus, the inductive communications system taught by Raynor is not suitable for the provision of high data transfer rate underwater wireless communications.

SUMMARY OF THE INVENTION

A first object of the present invention is to provide a system for underwater communications based on the transmission of electromagnetic signals from a transmitter to a receiver. The system for underwater communications of the present is capable of providing a higher data transfer rate for a given range of communications than current prior art systems for underwater communications.

A second object of the present invention is to provide a system for underwater communications having a means to reduce the electrical conductivity of the water which fills the region between a transmit antenna of the transmitter and a receive antenna of the receiver.

According to a first aspect of the present invention a system for underwater communications is provided comprising a transmitter for transmitting electromagnetic signals and a receiver for receiving the transmitted signals. The transmitter comprises a transmit antenna, and the receiver comprises a receive antenna. The system for underwater communications of the present invention further comprises a fluid modifying means.

The system for underwater communications has an active mode of operation and an inactive mode where the transmit antenna and the receive antenna are arranged so that the during the inactive mode, the region between them is occupied by water.

During the active mode of operation, the fluid modifying means provides a reduced conductivity fluid in a portion of the region between the transmit antenna and the receive antenna and electromagnetic signals are transmitted from the transmitter to the receiver at least partially via the reduced conductivity fluid.

In one embodiment of the system for underwater communications of the present invention, the fluid modifying means is a gas bubble generator, which injects gas bubbles into the water. Preferably, the injected gas bubbles are formed of one of nitrogen, oxygen, carbon dioxide, helium, hydrogen or water vapor. Alternatively, the injected gas bubbles are formed of air or a mixture of two or more of nitrogen, oxygen, carbon dioxide, helium, hydrogen and water vapor.

In another embodiment of the system for underwater communications of the present invention the fluid modifying means is a gas jet which emits a gas into the water. The gas jet may be configured so that the emitted gas provides a region between the transmit and receive antennas which is exclusive of water. Preferably, the emitted gas is one of nitrogen, oxygen, carbon dioxide, helium, hydrogen or water vapor. Alternatively, the emitted gas is air or a mixture of two or more of nitrogen, oxygen, carbon dioxide, helium, hydrogen and water vapor or may any gas or mixture of gasses.

In another embodiment of the system for underwater communications of the present invention, the fluid modifying means comprises a rotor which generates gas bubbles in the water by mechanical means.

In another embodiment of the system for underwater communications of the present invention, the fluid modifying means comprises an outlet which emits a liquid into the water. The emitted liquid may be water having a lower salinity compared with the fluid it displaces. Alternatively, the emitted liquid may be oil. Further alternatively, the emitted liquid may be any liquid which has a lower electrical conductivity compared with the fluid in the region between the transmit antenna and the receive antenna when the system is in the inactive mode.

In another embodiment of the system for underwater communications of the present invention, the fluid modifying means comprises a pair of electrodes arranged about the transmit antenna and the receive antenna and which produce electrolysis in the water thereby producing gas bubbles in the region between the transmit antenna and the receive antenna.

In some embodiments of the system for underwater communications of the present invention a skirt is provided which surrounds the transmit antenna and the receive antenna for containing and/or trapping the modified fluid.

In some embodiments of the system for underwater communications of the present invention a mechanical device is provided which, during the active mode of operation, stirs the modified fluid in the region between the transmit antenna and the receive antenna.

Preferably, the electromagnetic signals which are transmitted from the transmitter to the receiver of the present invention have a frequency in the range from 10 Hz to 100 MHz.

Optionally, at least one of the transmit antenna and the receive antenna of the system for underwater communications of the present invention is a magnetically coupled antenna.

Further optionally, at least one of the transmit antenna and the receive antenna of the system for underwater communications of the present invention is an antenna comprising a pair of electrodes which are in conductive contact with the water.

In some embodiment of the system for underwater communications of the present invention there is provided an underwater vehicle and a base station. The transmitter is mounted on or housed inside the underwater vehicle, and the receiver is mounted on or housed inside the underwater base station. The transmit antenna is mounted externally to the underwater vehicle, and the receive antenna is mounted externally to the underwater base station. Prior to commencement of the active mode of operation, the underwater vehicle navigates to a pre-defined region adjacent to the underwater base station. Preferably, the pre-defined region is such that the transmit antenna and the receive antenna are positioned within a range of each other which is less than ten wavelengths of the electromagnetic signals.

In some embodiment of the system for underwater communications of the present invention a secondary transmitter is located at the receiver, for sending electromagnetic signals to a secondary receiver located at the transmitter. In this way electromagnetic signals are sent from the secondary transmitter to the secondary receiver via the modified fluid providing bi-directional underwater communications. Optionally, the secondary transmitter comprises a secondary transmit antenna and the secondary receiver may comprises a secondary receive antenna. Alternatively, the secondary transmitter may share the receive antenna of the receiver, and the secondary receiver may share the transmit antenna of the receiver.

According to a second aspect of the present invention a system for underwater communications is provided comprising a first transceiver for transmitting and receiving electromagnetic signals and a second transceiver for transmitting and receiving electromagnetic signals. The first transceiver comprises a first antenna, and the second transceiver comprises a second antenna, the system having an active mode of operation and an inactive mode where the first antenna and the second antenna are arranged so that during the inactive mode, the region extending between them is occupied by water.

The system further comprises a fluid modifying means. During the active mode of operation, the fluid modifying means provides a reduced conductivity fluid in a portion of the region between the first and second antennas. Electromagnetic signals sent between the first transceiver and the second transceiver at least partially via the reduced conductivity fluid.

Embodiments of the present invention will now be described with reference to the accompanying figures in which:

DETAILED DESCRIPTION

Figure 1:
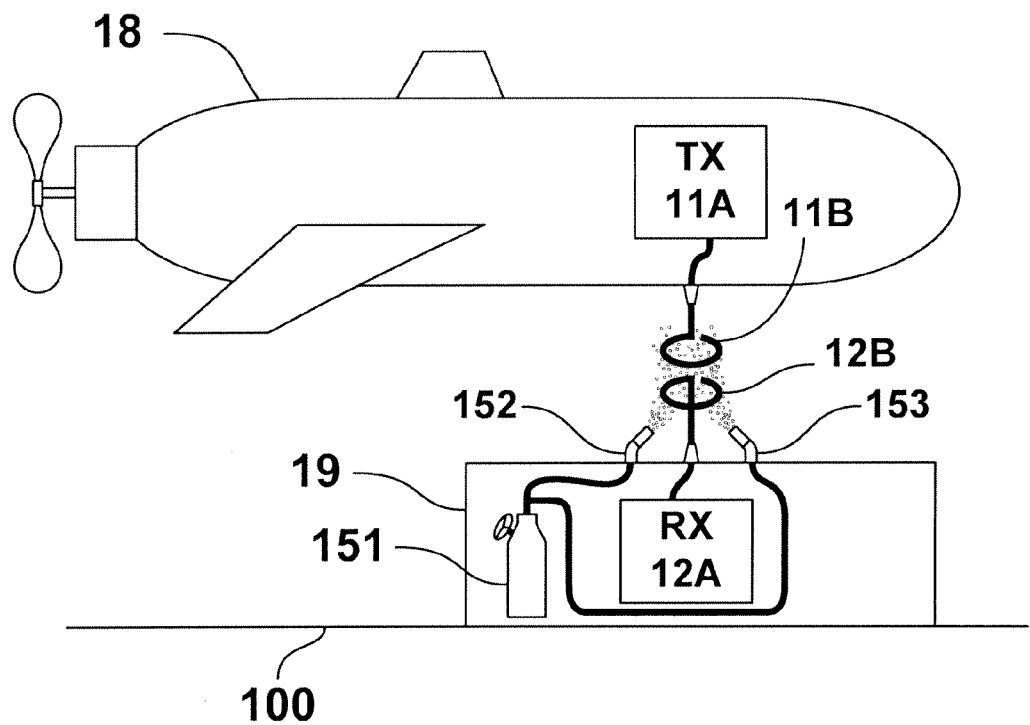
FIG. 1 shows a diagram of an underwater communications system according to a first embodiment of the present invention.

FIG. 1 shows a diagram of an underwater communications system according to an embodiment of the present invention. The embodiment of the present invention depicted in FIG. 1 comprises transmitter 11A having transmit antenna 11B, receiver 12A having receive antenna 12B, gas supply 151 connected to a plurality of gas jets 152, 153, underwater vehicle 18 and underwater base station 19. Transmitter 11A is housed inside underwater vehicle 18, and is connected to transmit antenna 11B which is mounted on the underside of underwater vehicle 18. Receiver 12A is housed inside base station 19, and is connected to receive antenna 12B which is mounted on an upper surface of base station 19. Base station 19 is typically located on the seabed 100. In use, underwater vehicle 18 navigates to a location so that transmit antenna 11B and receive antenna 12B are located within a short distance of each other and so that transmit antenna 11B is located above receive antenna 12B. During an active mode of operation, electromagnetic signals are transmitted from transmitter 11A to receiver 12A via transmit antenna 11B and receive antenna 12B. Thus, the transmitted electromagnetic signals follow a path through the water. The transmitted electromagnetic signals typically comprise a data stream modulated onto a carrier signal.

In the active mode of operation, gas jets 152, 153 attached to an upper surface of base station 19 inject gas bubbles into the volume between transmit antenna 11B and receive antenna 12B.

The conductivity of most substances in their gaseous phase is extremely low. A fluid volume comprising a regularly distributed mixture of sea water and gas bubbles will have a bulk electrical conductivity equal to the water conductivity divided by the volumetric ratio occupied by the gas. Thus, the effect of the injected gas bubbles in the volume of fluid between transmit antenna 11B and receive antenna 12B is to provide a modified fluid in the same region having a reduced electrical conductivity. The reduced electrical conductivity of the fluid in the volume between transmit antenna 11B and receive antenna 12B provides a signal path in the fluid having a lower attenuation with distance. Moreover, since attenuation with distance increases as the carrier frequency of the signal is increased the effect of the reduced electrical conductivity of the fluid the volume between transmit antenna 11B and receive antenna 12B is to permit electromagnetic signals having a higher carrier frequency to pass between transmit antenna 11B and receive antenna 12B so that a higher data transfer rate between transmitter 11A and receiver 12A is permitted compared with a system without a modified fluid in the region between transmit antenna 11B and receive antenna 12B.

The injected gas bubbles may be formed of any one of or any mixture of nitrogen, oxygen, carbon dioxide, helium, hydrogen and water vapor.

More generally, the injected gas bubbles may be formed of any gas or mixture of gasses where the bubbles which are injected into the region between the transmit antenna and the receive antenna provide a fluid having a reduced electrical conductivity in the same region.

To maintain a sufficiently high level of the signal to noise ratio of the received signal, the range between transmit antenna 11B and receive antenna 12B is preferably within ten wavelengths of the carrier signal. Similarly, the frequency range of electromagnetic signals is preferably within a frequency range from 10 Hz to 100 MHz.

Figure 2:
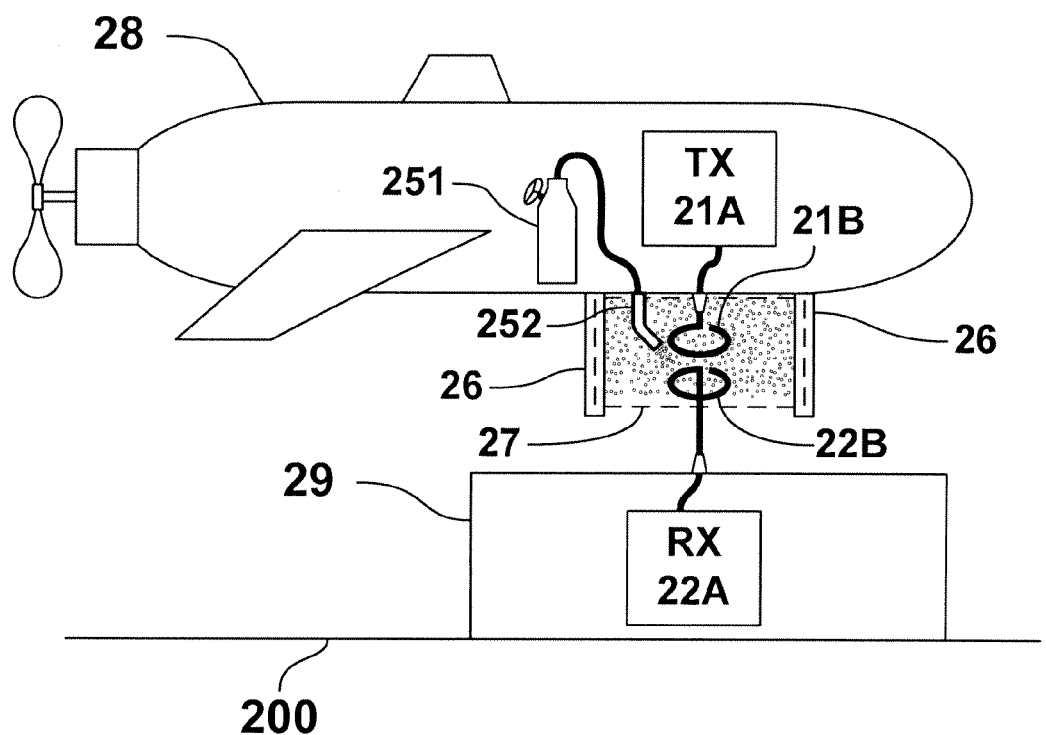
FIG. 2 shows a diagram of an underwater communications system according to a second embodiment of the present invention.

FIG. 2 shows a diagram of an underwater communications system according to a second embodiment of the present invention. The embodiment of the present invention depicted in FIG. 2 comprises transmitter 21A having transmit antenna 21B, receiver 22A having receive antenna 22B, gas supply 251 which is connected to gas jet 252, skirt 26 which defines a volume 27 surrounding TX antenna 21B, underwater vehicle 28 and underwater base station 29. Transmitter 21A is typically housed inside underwater vehicle 28, and is connected to transmit antenna 21B which is mounted on the underside of underwater vehicle 28. Gas supply 251 and gas jet 252 are also housed inside underwater vehicle 28. Receiver 22A is typically housed inside base station 29, and is connected to receive antenna 22B which is mounted on an upper surface of base station 29. Base station 29 is typically located on the seabed 200. In use, underwater vehicle 28 navigates to a location so that transmit antenna 21B and receive antenna 22B are located within a short distance of each other. During an active mode of operation, electromagnetic signals are transmitted from transmitter 21A to receiver 22A via transmit antenna 21B and receive antenna 22B. The transmitted electromagnetic signals follow a path through the water. In the active mode of operation, gas jet 252, attached to the underside of underwater vehicle 28, emits gas and/or gas bubbles into the volume 27 defined by skirt 26.

The effect of the emitted gas and/or gas bubbles in the volume 27 defined by skirt 26 is to provide a modified fluid in the same region having a reduced electrical conductivity. The modified fluid having a reduced electrical conductivity lies between transmit antenna 21B and receive antenna 22B. Thus, a signal path between transmit antenna 21B and receive antenna 22B is provided having reduced attenuation with distance compared with a signal path through seawater.

In order to achieve substantially higher data rates of communications from transmit antenna 21B and receive antenna 22B, the gas emitted by gas jet 252 may be emitted at a sufficiently rapid rate so that volume 27 defined by skirt 26 is completely filled with gas emitted by gas jet 252, and so that water is excluded from volume 27. In this case, there is a path for electromagnetic signals between transmit antenna 21B and receive antenna 22B which is entirely through the gas filling volume 27. This path, through gas, will have a greatly reduced electrical conductivity compared with a path through sea water, thereby providing a system for underwater communications capable of a greatly increased data transfer rate for a given range of communications compared with prior art systems for underwater communications.

Figure 3:
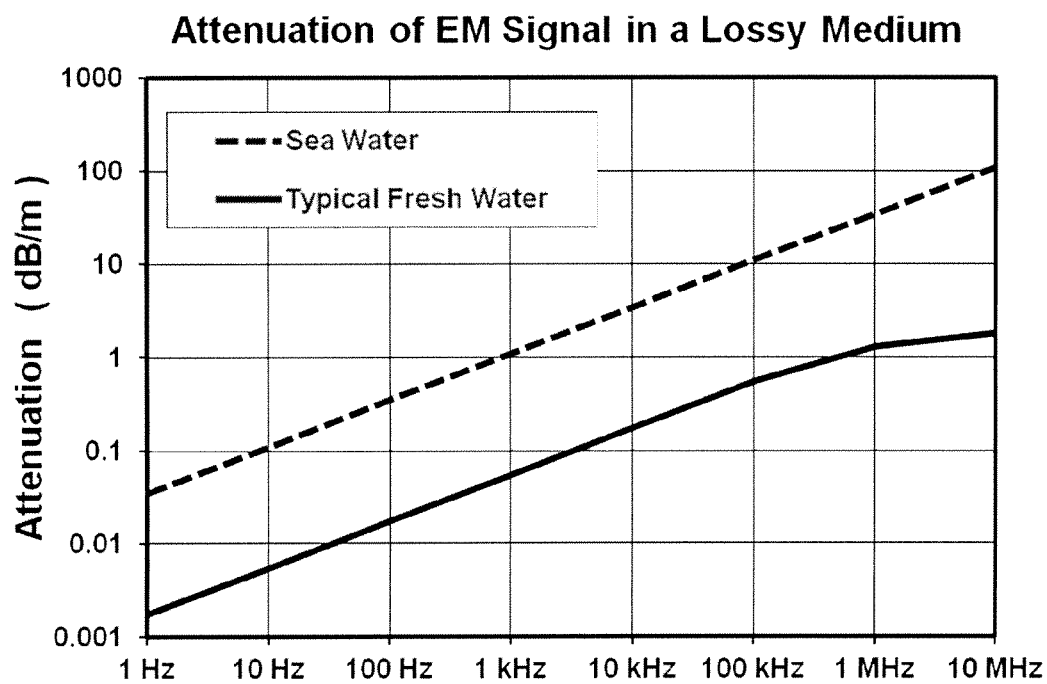
FIG. 3 shows a plot of the attenuation per meter versus frequency for electromagnetic signals travelling through a lossy medium such as water.

FIG. 3 shows a plot of the attenuation per meter versus frequency for electromagnetic signals travelling through a lossy medium such as water. Two traces are shown in FIG. 3, one showing the attenuation per meter of an electromagnetic signal propagating through fresh water, and another showing the attenuation per meter of an electromagnetic signal propagating through sea water. Seawater has a relatively high electrical conductivity due the relatively high salinity thereof; thus the attenuation per meter of an electromagnetic signal propagating in seawater is more than one order of magnitude greater than the attenuation per meter of an electromagnetic signal propagating in fresh water.

Figure 4:
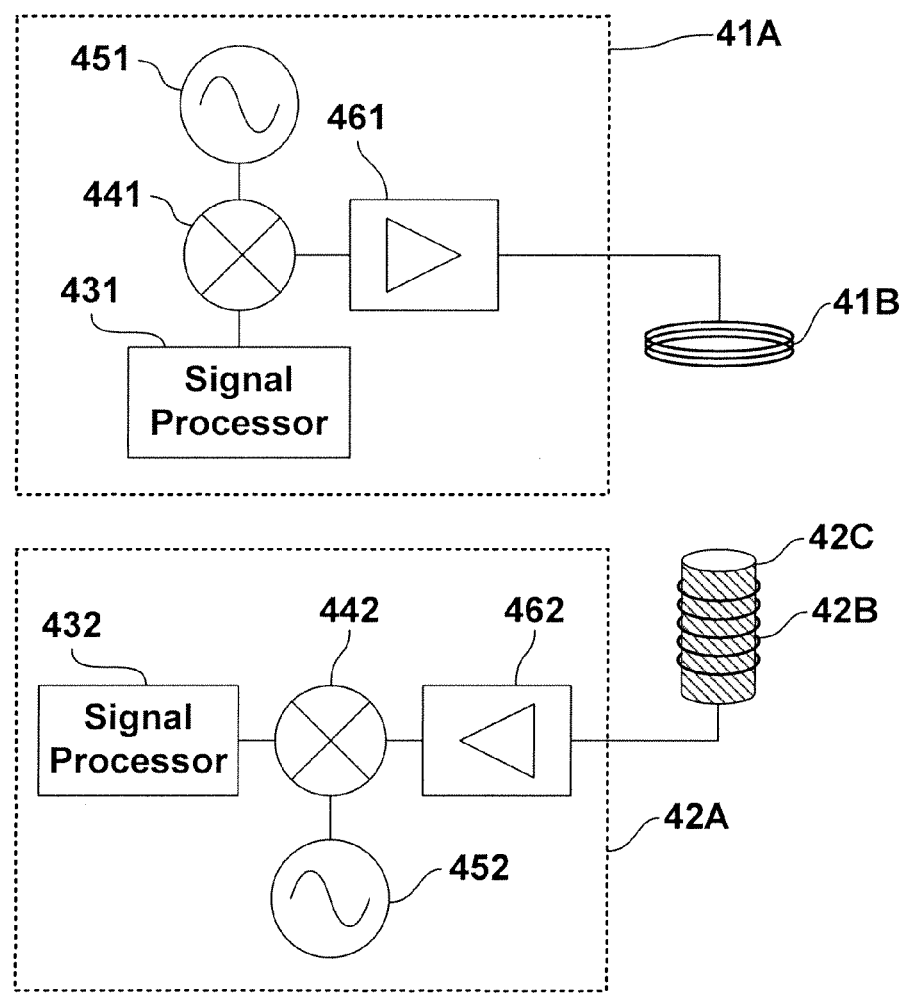
FIG. 4 shows a block diagram of a transmitter comprising a transmit antenna and a receiver comprising a receive antenna suitable for use in the embodiments of the present invention.

FIG. 4 shows a block diagram of a transmitter 41A connected to a transmit antenna 41B and a receiver 42A connected to a receive antenna 42B which is wound on a core of a material having a high relative magnetic permeability suitable for use in the various embodiments of the present invention. Materials having a relative permeability of 10 or greater are suitable for the purpose of increasing the sensitivity of receive antenna 42B. Transmitter 41A comprises signal processor 431 mixer 441, signal generator 451 and power amplifier 461. Receiver 42A comprises low noise amplifier 462, mixer 442, signal generator 452 and signal processor 432. In transmitter 41A, an input signal from signal processor 431 is mixed with a carrier signal generated by signal generator 451, is amplified by amplifier 461 and is fed to antenna 41B for transmission. Signals transmitted by transmit antenna 41B are received by receive antenna 42B, are passed to receiver 42A and are amplified by low noise amplifier 462. The amplified signals are mixed with a carrier signal generated by signal generator 442 producing a digital output which is fed to signal processor 432. The transmitter 41A and the receiver 42A of FIG. 4 may further comprise various baseband circuitry, signal processing circuitry, digital interfaces, storage devices etc as would be known to a person skilled in the art of transmitter and receiver design.

Figure 5:
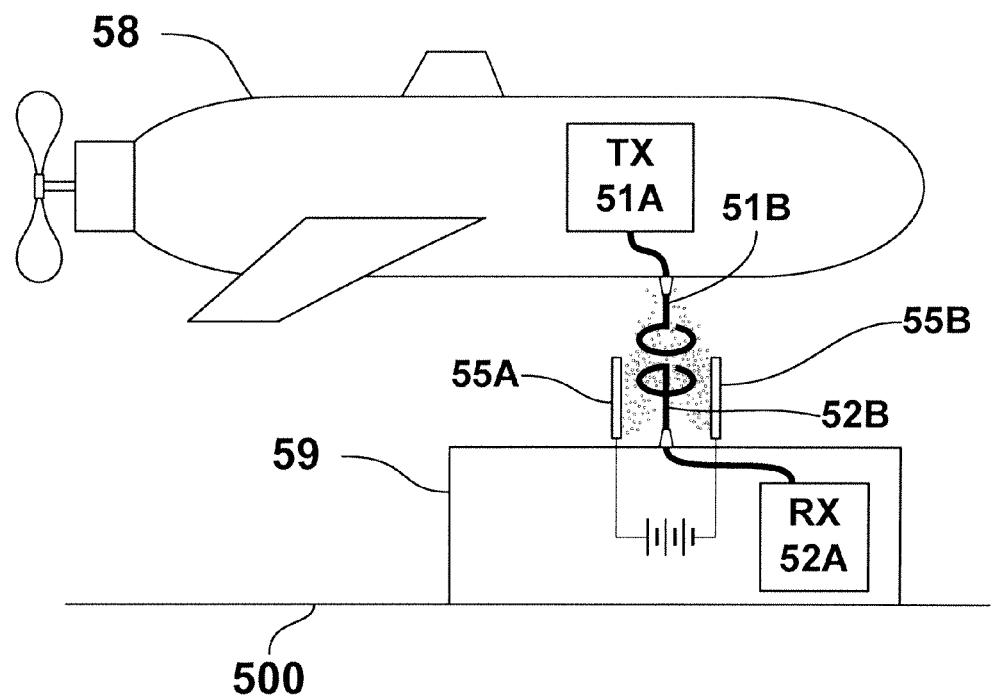
FIG. 5 shows a diagram of an underwater communications system according to a third embodiment of the present invention.

FIG. 5 shows a diagram of an underwater communications system according to a third embodiment of the present invention. The embodiment of the present invention depicted in FIG. 5 comprises transmitter 51A having transmit antenna 51B, receiver 52A having receive antenna 52B, electrodes 55A, 55B, underwater vehicle 58 and underwater base station 59. Transmitter 51A is typically housed inside underwater vehicle 58, and is connected to transmit antenna 51B which is mounted on the underside of underwater vehicle 58. Receiver 52A is typically housed inside base station 59, and is connected to receive antenna 52B which is mounted on an upper surface of base station 59, similarly electrodes 55A, 55B are mounted on the same upper surface of base station 59, so that receive antenna 52B is sandwiched between electrodes 55A, 55B. In use, underwater vehicle 58 navigates to a location so that transmit antenna 51B and receive antenna 52B are located within a short distance of each other and so that transmit antenna 51B is located directly above receive antenna 52B. During an active mode of operation, electromagnetic signals are transmitted from transmitter 51A to receiver 52A via transmit antenna 51B and receive antenna 52B. The transmitted electromagnetic signals follow a path through the water. In the active mode of operation, a voltage difference is applied to electrodes 55A and 55B. The voltage difference across electrodes 55A and 55B produces a current which passes through the water and which follows a path across receive antenna 52B. The current passing through the water produces electrolysis, so that bubbles of hydrogen and oxygen and other gasses are produced at electrodes 55A and 55B. The bubbles of hydrogen and oxygen and other gasses which are produced at electrodes float upwards, thereby creating a path between receive antenna 52B and transmit antenna 51B having a reduced electrical conductivity compared with seawater.

In seawater applications and when the underwater communications system of the present invention is inactive, the fluid occupying the region between the transmit antenna and the receive antenna is seawater. Typically, seawater has a salinity of between 3.1% and 3.8%, representing a range of approximately 31 to 38 grams of salt per liter of water. The high salinity of seawater produces a high electrical conductivity, and correspondingly produces a higher level of attenuation of an electromagnetic signal per meter of propagation compared with the same signal propagating in fresh water. For a signal having a carrier frequency of 1 kHz, the attenuation in seawater is 1 dB per meter. By contrast, the attenuation of an electromagnetic signal having a carrier frequency of 1 kHz in fresh water is 0.05 dB per meter.

Figure 6:
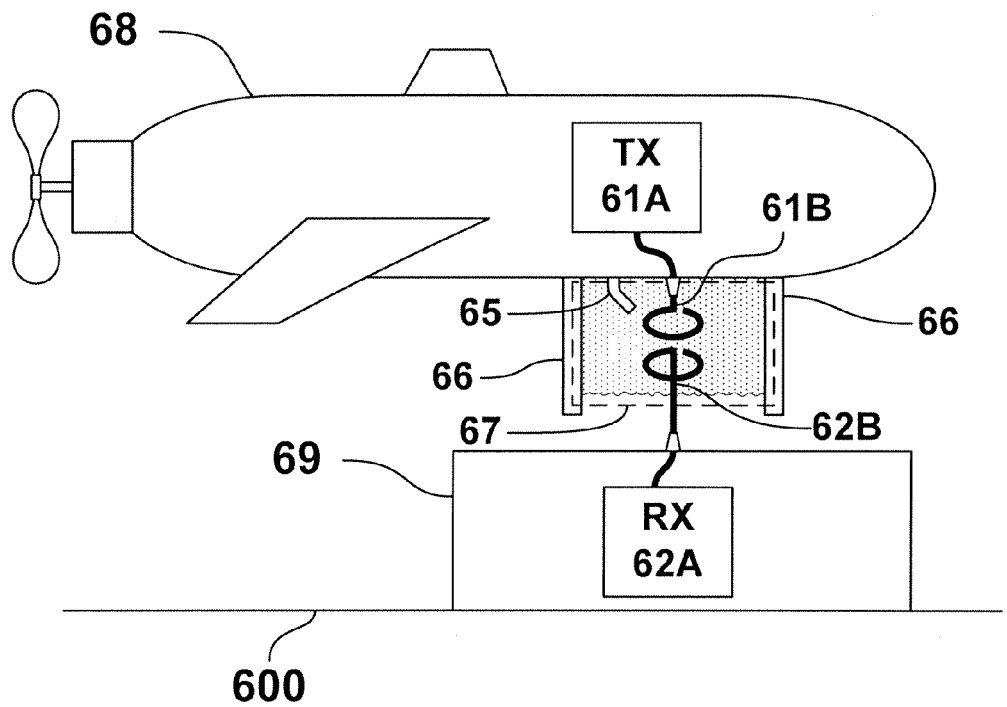
FIG. 6 shows a diagram of an underwater communications system according to a fourth embodiment of the present invention.

FIG. 6 shows a diagram of an underwater communications system according to a fourth embodiment of the present invention. The embodiment of the present invention depicted in FIG. 6 comprises transmitter 61A having transmit antenna 61B, receiver 62A having receive antenna 62B, liquid outlet 65, skirt 66 defining a volume 67, underwater vehicle 68 and underwater base station 69. Transmitter 61A is housed inside underwater vehicle 68 and is connected to transmit antenna 61B which is mounted on the underside of underwater vehicle 68. Receiver 62A is housed inside base station 69 and is connected to receive antenna 62B which is housed on an upper surface of base station 69. Skirt 66 is attached to the underside of underwater vehicle 68 and surrounds transmit antenna 61B. In use, underwater vehicle 68 navigates so that transmit antenna 61B and receive antenna 62B are located adjacent to each other. The preferred position of underwater vehicle 68 is so that both transmit antenna 61B and receive antenna 62B are accommodated inside the volume 67 defined by skirt 66. During an active mode of operation, electromagnetic signals are transmitted from transmitter 61A to receiver 62A via transmit antenna 61B and receive antenna 62B. In the active mode of operation, liquid outlet 65, attached to the underside of underwater vehicle 68 emits a liquid into the volume 67 defined by skirt 66. Thus, during the active mode of operation, the transmitted electromagnetic signals follow a path through the emitted liquid. The emitted liquid is selected based on the effects of its properties on an electromagnetic signal propagating through the liquid. Specifically, a liquid having a reduced electrical conductivity compared with seawater is suitable for use in the embodiment of the present invention depicted in FIG. 6. One such liquid is fresh water. Fresh water has a lower electrical conductivity than seawater and consequently attenuates an electromagnetic signal less rapidly with propagating distance. Moreover, fresh water has a lower mass density than seawater, and therefore when fresh water is injected into the volume 67 defined by skirt 66, it will tend to remain in the upper regions of the volume. Thus a stable halocline is maintained in the volume 67 defined by skirt 66 by the emitted fresh water due to the positive buoyancy of the fresh water when in seawater.

Figure 7:
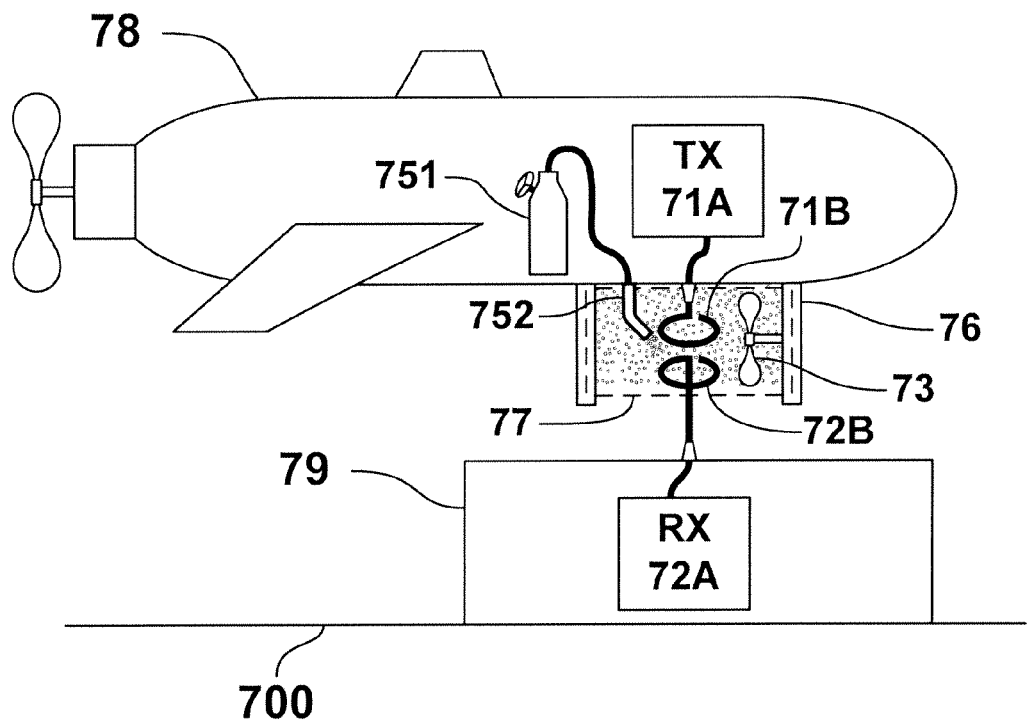
FIG. 7 shows a diagram of an underwater communications system according to a fifth embodiment of the present invention.

FIG. 7 shows a diagram of an underwater communications system according to a fifth embodiment of the present invention. The embodiment of the present invention depicted in FIG. 7 comprises transmitter 71A having transmit antenna 71B, receiver 72A having receive antenna 72B, gas supply 751 which is connected to gas jet 752, skirt 76 which defines a volume 77 surrounding TX antenna 71B, underwater vehicle 78 and underwater base station 79. Transmitter 71A is typically housed inside underwater vehicle 78, and is connected to transmit antenna 71B which is mounted on the underside of underwater vehicle 78. Gas supply 751 and gas jet 752 are also housed inside underwater vehicle 78. Receiver 72A is typically housed inside base station 79, and is connected to receive antenna 72B which is mounted on an upper surface of base station 79. Base station 79 is typically located on the seabed 700. In use, underwater vehicle 78 navigates to a location so that transmit antenna 71B and receive antenna 72B are located within a short distance of each other. During an active mode of operation, electromagnetic signals are transmitted from transmitter 71A to receiver 72A via transmit antenna 71B and receive antenna 72B. The transmitted electromagnetic signals follow a path through the water. In the active mode of operation, gas jet 752, attached to the underside of underwater vehicle 78, injects gas bubbles into the volume 77 defined by skirt 76. At the same time, rotor 73 spins around so as to mix the fluid comprising seawater and gas bubbles in the region between transmit antenna 71B and receive antenna 72B. The mechanical movement of rotor 73 in seawater produces additional gas bubbles through the process of cavitation—i.e. the formation of bubbles in water arising from local pressure variations within the water. The combination of gas bubbles injected into the water by gas jet 752, the mixing of water with the gas bubbles, and the generation of gas bubbles by the process of cavitation providing a modified fluid in the region between transmit antenna 71B and receive antenna 72B having a reduced electrical conductivity compared with seawater.

In embodiments of the present invention, the transmit antennas—for example 11B of FIG. 1—may comprise multiple windings of an electrically insulated wire formed into the shape of a coil. Similarly, the receive antennas—for example 12B of FIG. 1—may comprise multiple windings of electrically insulated wire formed into the shape of a coil. For increased sensitivity, the receive antennas may be formed over a core formed of a material having a high relative magnetic permeability. Materials having a relative magnetic permeability with a value of 10 or more being suitable to significantly increase the sensitivity of the receive antennas.

Alternatively, the transmit and/or the receive antennas may be antennas which excite the electric field component of an electromagnetic signal Further alternatively, the transmit and/or the receive antennas may comprise a pair of electrodes which are in conductive contact with the water. The arrangement of such antennas, comprising a pair of electrodes in conductive contact with the water, produces a current flowing in the water. Such antennas are sometimes referred to as J-field antennas.

Figure 8:
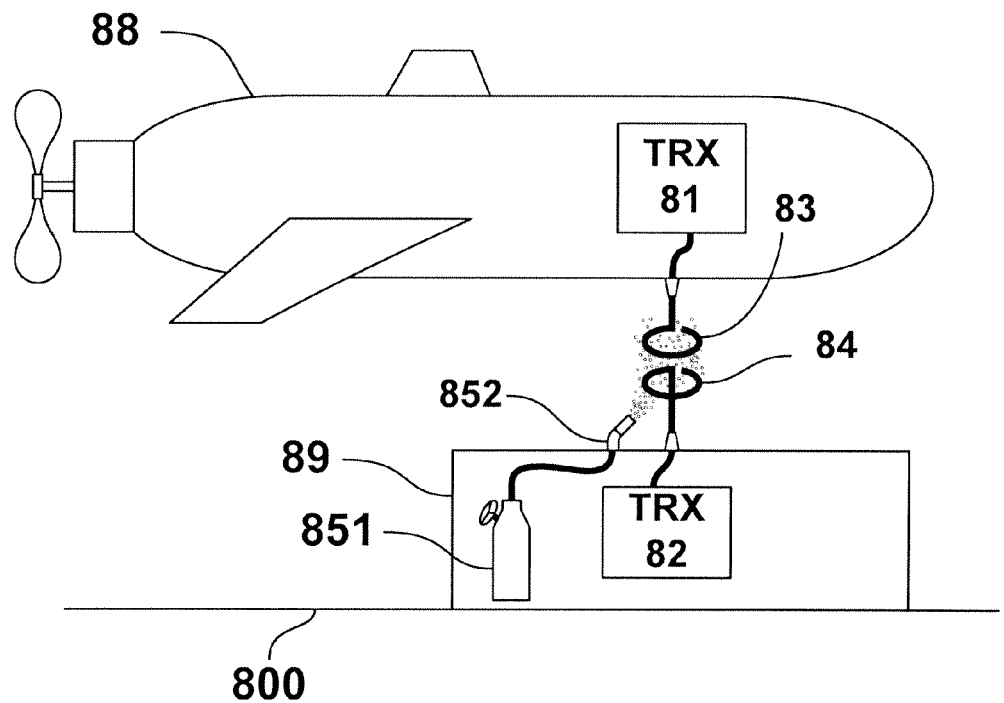
FIG. 8 shows a diagram of an underwater communications system according to a sixth embodiment of the present invention.

FIG. 8 shows a diagram of an underwater communications system according to a sixth embodiment of the present invention. The embodiment of the present invention depicted in FIG. 8 comprises first transceiver 81 having first antenna 83, second transceiver 82 having second antenna 84, gas supply 851 connected to gas jet 852, underwater vehicle 88 and underwater base station 89. First transceiver 81 is housed inside underwater vehicle 88, and is connected to first antenna 83 which is mounted on the underside of underwater vehicle 88. Second transceiver 82 is housed inside base station 89, and is connected to second antenna 84 which is mounted on an upper surface of base station 89. Base station 89 is typically located on the seabed 800. In use, underwater vehicle 88 navigates to a location so that first antenna 83 and second antenna 84 are located within a short distance of each other and so that first antenna 83 is located above second antenna 84. During an active mode of operation, electromagnetic signals are transmitted between first transceiver 81 and second transceiver 82 via first and second antennas 83, 84. Thus, the transmitted electromagnetic signals follow a path through the water.

In the active mode of operation, gas jet 852, attached to an upper surface of base station 89 inject gas bubbles into the volume between first and second antennas 83, 84, thereby providing a modified fluid in the region between first and antennas 83, 84 having a reduced electrical conductivity compared with seawater.

Embodiments of the communications system of the present invention is described herein with particular emphasis on seawater environments. However, they are equally applicable to fresh water and any brackish water environments where the provision of a fluid having a reduced electrical conductivity between a transmit antenna and a receive antenna would reduce the attenuation of an electromagnetic signal with distance as it passes from the transmit antenna to the receive antenna. Any optimization of the present invention to suit particular operating environments or for specific water saline constitutions remains within the scope of the present invention.

The descriptions of the specific embodiments herein are made by way of example only and not for the purposes of limitation. It will be obvious to a person skilled in the art that in order to achieve some or most of the advantages of the present invention, practical implementations may not necessarily be exactly as exemplified and can include variations within the scope of the present invention.

What is claimed is:

1. A system for underwater communications comprising
   a transmitter comprising a transmit antenna,
   receiver comprising a receive antenna and
   a fluid modifying means;
   said transmit antenna and said receive antenna being physically separated by a region,
   said system having an active mode of operation and an inactive mode;
   wherein during said inactive mode, the region between said transmit antenna and said receive antenna is occupied by water,
   and wherein, during said active mode of operation, said fluid modifying means provides a fluid having a reduced electrical conductivity in at least a portion of the region between said transmit antenna and said receive antenna and enables transmission of electromagnetic signals having lower attenuation from said transmitter to said receiver at least partially via said reduced electrical conductivity fluid.

2. A system for underwater communications according to claim 1 wherein said fluid modifying means comprises a gas bubble generator which emits gas bubbles into the water.

3. A system for underwater communications according to claim 1 wherein said fluid modifying means comprises a gas jet which emits gas into the water.

4. A system for underwater communications according to claim 3 where said emitted gas provides a region between said transmit and receive antennas which is exclusive of water.

5. A system for underwater communications according to claim 2 or claim 3 wherein said gas is air.

6. A system for underwater communications according to claim 2 or claim 3 wherein said gas is any one of nitrogen, oxygen, carbon dioxide, helium and hydrogen or any mixture of two or more thereof.

7. A system for underwater communications according to claim 1 wherein said fluid modifying means comprises a rotor which generates gas bubbles in the water.

8. A system for underwater communications according to claim 1 wherein said fluid modifying means comprises an liquid outlet which emits a liquid into the water.

9. A system for underwater communications according to claim 8 wherein said emitted liquid is water having a reduced salinity compared with the water occupying said region between said transmit and receive antennas during said inactive mode.

10. A system for underwater communications according to claim 8 wherein said emitted liquid is oil.

11. A system for underwater communications according to claim 8 wherein said emitted liquid is any liquid having a lower electrical conductivity than the water occupying said region between said transmit and receive antennas during said inactive mode.

12. A system for underwater communications according to claim 1 wherein said fluid modifying means comprises a pair of electrodes arranged to produce electrolysis in the water.

13. An underwater communications system according to claim 1 further comprising a skirt surrounding one of said transmit antenna and said receive antenna for containing said modified fluid.

14. An underwater communications system according to claim 1 further comprising a mechanical device which, during said active mode of operation, stirs the modified fluid in the region between said transmit and said receive antennas.

15. An underwater communications system according to claim 1 wherein said electromagnetic signals have a frequency in the range from 10 Hz to 100 MHz.

16. An underwater communications system according to claim 1 wherein at least one of said transmit antenna and said receive antenna is a magnetically coupled antenna.

17. An underwater communications system according to claim 1 wherein at least one of said transmit antenna and said receive antenna is an antenna comprising a pair of electrodes which are in conductive contact with the water.

18. An underwater communications system according to claim 1 wherein said transmitter is mounted on or housed in an underwater vehicle, and said receiver is mounted on or housed in an underwater base station.

19. An underwater communications system according to claim 18 wherein said transmit antenna is mounted externally to said underwater vehicle, and said receive antenna is mounted externally to said underwater base station.

20. An underwater communications system according to claim 18 wherein prior to commencement of said active mode of operation, said underwater vehicle navigates to a pre-defined region adjacent to said underwater base station.

21. An underwater communications system according to claim 20 wherein said pre-defined region is such that said transmit antenna and said receive antenna are positioned within a range of each other which is less than ten wavelengths of said electromagnetic signals.

22. An underwater communications system according to claim 1 wherein a secondary transmitter is located at said receiver, for sending secondary electromagnetic signals to a secondary receiver located at said transmitter.

23. An underwater communications system according to claim 22 wherein said secondary transmitter comprises a secondary transmit antenna and said secondary receiver comprises a secondary receive antenna.

24. An underwater communications system according to claim 22 wherein electromagnetic signals are sent from said secondary transmitter to said secondary receiver via said modified fluid.

25. A system for underwater communications comprising a first transceiver and a second transceiver,
 said first transceiver comprising a first antenna and said second transceiver comprising a second antenna,
 said system having an active mode of operation and an inactive mode,
 said first antenna and said second antenna being arranged so that during said inactive mode the region extending between them is occupied by water,
 said system further comprising a fluid modifying means,
 wherein, during an active mode of operation, said fluid modifying means provides a reduced conductivity fluid in the region between said first antenna and said second antenna and electromagnetic signals are transmitted between said first transceiver and said second transceiver at least partially via said modified fluid.

* * * * *